United States Patent
White

(10) Patent No.: US 7,581,089 B1
(45) Date of Patent: Aug. 25, 2009

(54) METHOD OF PROTECTING A COMPUTER STACK

(75) Inventor: Andrew H. White, Baltimore, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 280 days.

(21) Appl. No.: 11/787,832

(22) Filed: Apr. 18, 2007

Related U.S. Application Data

(60) Provisional application No. 60/793,546, filed on Apr. 20, 2006.

(51) Int. Cl.
*G06F 12/14* (2006.01)

(52) U.S. Cl. ...................................... 712/242
(58) Field of Classification Search ................. 712/242
See application file for complete search history.

(56) References Cited

U.S. PATENT DOCUMENTS

| | | | |
|---|---|---|---|
| 4,558,176 A | 12/1985 | Arnold et al. | |
| 5,222,220 A * | 6/1993 | Mehta | 714/38 |
| 5,864,707 A | 1/1999 | Tran et al. | |
| 5,881,278 A | 3/1999 | Tran et al. | |
| 5,949,973 A | 9/1999 | Yarom | |
| 5,968,169 A | 10/1999 | Pickett | |
| 6,070,198 A | 5/2000 | Krause et al. | |
| 6,269,436 B1 | 7/2001 | Tran et al. | |
| 6,301,699 B1 | 10/2001 | Hollander et al. | |
| 6,578,094 B1 | 6/2003 | Moudgill | |
| 6,618,797 B1 | 9/2003 | Dery et al. | |
| 6,766,513 B2 | 7/2004 | Charnell et al. | |
| 6,769,004 B2 | 7/2004 | Barrett | |
| 6,941,473 B2 | 9/2005 | Etoh et al. | |
| 6,996,677 B2 | 2/2006 | Lee et al. | |
| 7,165,150 B2 | 1/2007 | Alverson et al. | |
| 7,178,010 B2 | 2/2007 | McDonald | |
| 2003/0217277 A1 * | 11/2003 | Narayanan | 713/187 |

OTHER PUBLICATIONS

Etoh, H., etal. Protecting from stack-smashing attacks, Jun. 2000, IBM, 13 pages.*
Patil, H., etal., Low-cost Concurrent Checking of Pointer and Array Accesses in C Programs.1997, John Wiley & Sons Ltd., pp. 87-110.*

(Continued)

*Primary Examiner*—Eric Coleman
(74) *Attorney, Agent, or Firm*—Eric Froehlich

(57) ABSTRACT

A method of protecting a return address on a computer stack is disclosed. Two stacks are created, the first a normal stack, and the second, or shadow, having shadow frames containing the return address upon a subroutine call, the address on the first stack where the return address is stored, and a user-definable state variable which is used to identify a shadow frame as a return address. Before returning from a subroutine, the two return addresses are compared, and if they do not match, the second stack is searched down, and then up, for a matching return address. If there is a match, the shadow is re-synchronized with the first stack by comparing the stored values of the first stack pointer with the first stack pointer and adjusting appropriately the shadow stack pointer. The matching shadow frame must also be a return address datatype of return address.

8 Claims, 3 Drawing Sheets

OTHER PUBLICATIONS

U.S. Appl. No. 10/229,712, filed Apr. 3, 2003, Milliken.
U.S. Appl. No. 10/313,940, filed Sep. 25, 2003, Cowen, et al.
U.S. Appl. No. 10/386,709, filed Sep. 18, 2003, Naganuma, et al.
U.S. Appl. No. 10/726,229, filed Aug. 26, 2004, Brodley, et al.
U.S. Appl. No. 10/835,496, filed Dec. 16, 2004, Asher, et al.
U.S. Appl. No. 10/746,667, filed Jun. 23, 2005, McKeen.
U.S. Appl. No. 10/644,399, filed Feb. 24, 2005, McKeen.
U.S. Appl. No. 10/768,750, White.
U.S. Appl. No. 10/813,599, filed Oct. 6, 2005, Wu, et al.
U.S. Appl. No. 11/014,111, filed Jul. 20, 2006, Gentry, et al.
U.S. Appl. No. 11/095,719, filed Oct. 05, 2006, Cheng, et al.
U.S. Appl. No. 11/165,268, filed Dec. 28, 2006, Stempel, et al.
Dildog, The Tao of Windows Buffer Overflow, posted on the Internet at www.cultdeadcow.com, 1999.
Aleph One, Smashing the Stack for Fun and Profit, posted on the Internet at http://reactor-core.org/stack-smashing.html.
Frantzen and Shuey, StackGhost: Hardware Facilitated Stack Protection, posted on the Internet at www.stackghost.cerias.perdue.edu.
Cowen, Protecting Systems from Stack Smashing Attacks with StackGuard, posted on the Internet at www.cse.ogi.edu/DISC/projects/immunix.
Cowen, MemGuard, posted on the Internet at http://www.usenix.org/publications/library/proceedings/sec98/full_papers/cowan/cowan_html/node7.html.
Baratloo et al., Transparent Run-Time Defense against Stack Smashing Attacks.
Stackshield, posted on the Internet at http://www.angelfire.com/sk/stackshield/.
Avanzato, Bypassing Stackguard and Stackshield, posted on the Internet at www.wntrmute.com/docs/hack/bypassing stackguard and stackshield.htm.
Hsu, RAD: A Compile-Time Solution to Buffer Overflow Attacks, posted on the Internet at http://www.ecsl.cs.sunysb.edu/tr/TR96.pdf.
Sinnadurai, et al., Transparent Runtime Shadow Stack: Protection against malicious return address modifications, posted on at http://www.comp.nus.edu.sg/~saravanl/truss.pdf.

* cited by examiner

METHOD OF PROTECTING A COMPUTER STACK

CROSS REFERENCE TO RELATED APPLICATIONS

This application is a claims priority to U.S. Provisional Patent Application Ser. No. 60/793,546, filed Apr. 20, 2006 entitled "METHOD OF PROTECTING A COMPUTER STACK."

FIELD OF THE INVENTION

The present invention relates, in general, to electrical computers and digital processing systems pertaining to processing architectures and instruction processing and, in particular, to a stack based computer.

BACKGROUND OF THE INVENTION

Computer software can be exploited by using mistakes in the processing of input data, which allow an attacker to overwrite executable data (Return Addresses, Function Pointers, jump tables, etc) with data of his choice. The overwritten executable data eventually is loaded into the instruction pointer and the attacker gains control of the application. These exploits are generically known as buffer overflow attacks. A specific type of overflow, known as a stack overflow, overwrites a return address stored on the stack. In general, these attacks are responsible for billions of dollars in damage from malicious users and exploiting the stack is the majority of publicly disclosed exploits in this category.

There are two types of overflow exploit techniques: an adjacent overwrite and a direct overwrite. An adjacent overwrite requires two adjacent memory areas, A and B where B is the target. The data normally is just copied by the program into A but also can accidentally "overflow" into B by some means (i.e. the exploit). This is the "classic" overflow. In a direct overwrite, there are three memory areas required; A and B, which are adjacent and C the ultimate target. C is not required to be adjacent to B or A. This is usually a multi-step affair. An overflow occurs from A into B. B is used by the program later as an address for a data copy. Since B is now defined by the overflow, it can target C and may copy parts of A to it. The attacker has the opportunity to overwrite any location in the process address space. There is not a requirement for the target memory to be adjacent to a data object he has access to. Heap data structure exploits such as double free's are an example of direct overwrite technique.

Most applications today are compiled from a procedure-based language such as C or Java and run on single stack computer architectures (e.g. x86, powerPC, Sparc, ARM, etc). In these environments, sub-routines are invoked by a call instruction (e.g. call, bl, etc), which ultimately stores a return address to the invoking sub-routine onto the stack. The invoked sub-routine sets up a stack frame for local variables, does some work, cleans up the stack frame, and returns to the invoker with a return instruction. The return instruction gets the address of the next instruction from the stack. In some computer architectures (typically RISC), the leaf node of the call graph will not store the return address onto the stack. It will remain in a register but the non-leaf call frames will have stored the return address onto the stack.

The stack exploit modifies the dormant return address stored on the stack. In the stack exploit scenario, the attacker controls the input that is used in one of the overflow techniques above to overwrite the return address on the stack. Now the return instruction fetches the return address stored by the attacker, not what the program stored there. When the return instruction finishes, the attacker will have hijacked the instruction pointer. Then there are many clever ways to continue execution of the hijacked process that have nothing to do with the original function of the application.

Known non-patent documents include:

"The Tao of Windows Buffer Overflow" by Dildog, and posted on the Internet at www.cultdeadcow.com, dated 1999.

An article entitled "Smashing the Stack for Fun and Profit," by Aleph One, and posted on the internet at http://reactor-core.org/stack-smashing.html discloses a method of overwriting the stack to usurp control of another's computer.

An article by Mike Frantzen and Mike Shuey, entitled "StackGhost: Hardware Facilitated Stack Protection," available on the Internet at www.stackghost.cerias.purdue.edu, discloses a method of combining an extra piece of hidden information called a cookie with a return address when it is stored on the stack by using an exclusive-or function. It is restored with an exclusive-or using the cookie. In order to successfully overwrite the "encrypted" return address, the attacker must also know the secret cookie. Therefore, a hacker need only obtain the contents of the stack through another means (e.g. a format string attack) to deduce the cookie in order to successfully overwrite the return address. The present invention does not suffer this weakness.

An article by Crispin Cowan et al., entitled "Protecting Systems from Stack Smashing Attacks with StackGuard," available on the Internet at www.cse.ogi.edu/DISC/projects/immunix discloses a method of adding additional information called a canary to the return address and testing any return address for the presence of the proper canary before allowing a program to continue. The disadvantages to using a canary are that the canary is stored in memory where a hacker can access it and a canary requires the user to recompile applications and libraries, some of which he may not have the source code to do so. The present invention does not require the user to recompile applications or libraries.

Crispin Cowan has also published a technique known as "MemGuard" for preventing return address changes. In MemGuard, individual words of memory can be designated as read-only except when written via a MemGuard API. Memguard's technique is done through an x86 specific set of 4 debug registers and can only protect call trees of 4 or less deep. The present invention is not limited in this regard.

An article from Arash Baratloo et al., entitled "Transparent Run-Time Defense Against Stack Smashing Attacks," disclose two methods called "Libsafe" and Libverify" that intercept all function calls and check the boundaries of information before storing it on the stack. If the information requested to be stored exceeds the boundary of one stack frame, the information is not stored. These methods guards against overwriting the stack, but do not guard against direct overwrites of memory as does the present invention.

Another method of protecting a computer stack is known as StackShield, which uses a second stack to store copies of return addresses. StackShield requires the user to recompile application and libraries and is susceptible to direct overwrite which the present invention is not.

An article by Livello Avanzato, entitled "Bypassing Stackguard and StackShield," discloses the disadvantages of Stackguard and StackShield.

An article entitled "RAD: A Compile-Time Solution to Buffer Overflow Attacks," by Fu-Haw Hsu, discloses a technique of creating a copy of the return address in a separate location that is surrounded by read-only guard pages. Like StackGuard, RAD requires the application to be re-compiled and RAD will not protect against direct overwrites.

An article entitled "Transparent Runtime Shadow Stack: Protection against malicious return address modifications," discusses prior art methods of preventing buffer overflow that require changes to either the compiler or the hardware, such as Smashguard and StackGhost. The method disclosed essentially consists of verifying the return address before using the return address.

Known patent documents include:

U.S. Pat. No. 4,558,176, entitled "COMPUTER SYSTEMS TO INHIBIT UNAUTHORIZED COPYING, UNAUTHORIZED USAGE, AND AUTOMATED CRACKING OF PROTECTED SOFTWARE," discloses that information such as return addresses may be encrypted using a secure encryption function, rather than a trivial one such as an exclusive-or function, to prevent a hacker from deducing the encryption key from the encrypted version of the return address and the plaintext version of the return address. U.S. Pat. No. 4,558,176 is hereby incorporated by reference into the specification of the present invention.

U.S. Pat. Nos. 5,864,707, entitled "SUPERSCALAR MICROPROCESSOR CONFIGURED TO PREDICT RETURN ADDRESSES FROM A RETURN STACK STORAGE"; 5,881,278, entitled "RETURN ADDRESS PREDICTION SYSTEM WHICH ADJUSTS THE CONTENTS OF RETURN STACK STORAGE TO ENABLE CONTINUED PREDICTION AFTER A MISPREDICTED BRANCH"; 5,968,169, entitled "SUPERSCALAR MICROPROCESSOR STACK STRUCTURE FOR JUDGING VALIDITY OF PREDICTED SUBROUTINE RETURN ADDRESSES"; and 6,269,436, entitled "SUPERSCALAR MICROPROCESSOR CONFIGURED TO PREDICT RETURN ADDRESSES FROM A RETURN STACK STORAGE"; disclose methods of using a call tag and a return tag (i.e., canaries) with a return address and comparing the same to predict the return address. The methods of U.S. Pat. Nos. 5,864,707; 5,881,278; 5,968,169; and 6,269,436 have the disadvantages of using a canary as listed above, which the present invention does not. U.S. Pat. Nos. 5,864,707; 5,881,278; 5,968,169; and 6,269,436 are hereby incorporated by reference into the specification of the present invention.

U.S. Pat. No. 5,949,973, entitled "METHOD OF RELOCATING THE STACK IN A COMPUTER SYSTEM FOR PREVENTING OVERRATE BY AN EXPLOIT PROGRAM," discloses a method of relocating the entire stack to a random memory location. The method of U.S. Pat. No. 5,949,973 guards against a direct stack overwrite, but does not guard against an overflow or a write to non-adjacent memory as does the present invention. U.S. Pat. No. 5,949,973 is hereby incorporated by reference into the specification of the present invention. U.S. Pat. No. 6,070,198, entitled "ENCRYPTION WITH A STREAMS-BASED PROTOCOL STACK," discloses a method of encrypting and decrypting data flowing through the stack. U.S. Pat. No. 6,070,198 is hereby incorporated by reference into the specification of the present invention.

U.S. Pat. No. 6,301,699, entitled "METHOD FOR DETECTING BUFFER OVERFLOW FOR COMPUTER SECURITY," discloses a method of detecting buffer overflows by determining a plurality of thresholds, analyzing a code to produce a validation value, and comparing the validation value with the thresholds to determine whether a buffer overflow would occur. The method of U.S. Pat. No. 6,301,699 guards against stack overwrite, but does not guard against a direct memory write as does the present invention. U.S. Pat. No. 6,301,699 is hereby incorporated by reference into the specification of the present invention.

U.S. Pat. No. 6,578,094, entitled "METHOD FOR PREVENTING BUFFER OVERFLOW ATTACKS," discloses a method of having a called procedure determine an upper bound that may be written to a stack allocated array/buffer without overwriting the stack-defined data. Before data is written to the stack, the upper bound is checked, which thereby prevents overwriting data. The present method does not check for an upper bound before writing data to a stack. U.S. Pat. No. 6,578,094 is hereby incorporated by reference into the specification of the present invention.

U.S. Pat. No. 6,618,797, entitled "DEVICE AND METHOD FOR PROTECTION AGAINST STACK OVERFLOW AND FRANKING MACHINE USING SAME," discloses a method assigning a separate stack for each program part. The method of U.S. Pat. No. 6,618,797 guards against stack overwrite, but not direct memory write. U.S. Pat. No. 6,618,797 is hereby incorporated by reference into the specification of the present invention.

U.S. Pat. No. 6,941,473, entitled "MEMORY DEVICE, STACK PROTECTION SYSTEM, COMPUTER SYSTEM, COMPILER, STACK PROTECTION METHOD, STORAGE MEDIUM AND PROGRAM TRANSMISSION APPARATUS," discloses a method of using a guard value, or canary, with the return address to guard tampering of the return address. The method of U.S. Pat. No. 6,941,473 has all of the disadvantages of using a canary as listed above, which the present invention does not. U.S. Pat. No. 6,941,473 is hereby incorporated by reference into the specification of the present invention.

U.S. Pat. No. 6,766,513, entitled "METHOD AND SYSTEM OF MEMORY MANAGEMENT USING STACK WALKING," discloses a method of deleting code from a stack by identifying code to be deleted, checking the frame for a return address to see if it relates to code that should be deleted, and if such a return address is found altering the contents of the stack and the return addresses to point to a correct place and deleting the unneeded code. The method of U.S. Pat. No. 6,766,513 deletes unneeded code, but does not identify which code is unneeded and does not address mismatched call functions. U.S. Pat. No. 6,766,513 is hereby incorporated by reference into the specification of the present invention.

U.S. Pat. No. 6,769,004, entitled "METHOD AND SYSTEM FOR INCREMENTAL STACK SCANNING," discloses a method of garbage collection wherein the stack scan can be implemented incrementally in units of individual stack location so that scanned portions of the stack do not have to be rescanned if the garbage collector is preempted. The stack scan method disclosed permits scanning the stack from the base of the stack toward the top, or from the top of the stack toward the base, and parses the stack into call frames. The disclosed method records the call frames continuation, so that the correct return location can be determined during an unwind operation. The method of U.S. Pat. No. 6,769,004 guards against stack overwrite for a single stack, but does not guard against stack overwrite using two or more stacks. U.S. Pat. No. 6,769,004 is hereby incorporated by reference into the specification of the present invention.

U.S. Pat. No. 6,996,677, entitled "METHOD AND APPARATUS FOR PROTECTING MEMORY STACKS," discloses a method of storing the return address in a separate stack upon execution of a jump command. The second stack stores the location on the first stack where the jump occurred and the return address. Before returning from the jump to a subroutine, a comparator is used to compare the return address on the first stack to the return address on the second stack. The method of U.S. Pat. No. 6,996,677 guards against stack overwrite, but does not handle unmatched call returns such as setjump/longjump. U.S. Pat. No. 6,996,677 is hereby incorporated by reference into the specification of the present invention.

U.S. Pat. No. 7,165,150, entitled "RESTRICTING ACCESS TO MEMORY IN A MULTITHREADED ENVIRONMENT," discloses a method of accessing a buffer without checking for the end of the buffer. The method uses a sentinel word to indicate when data is stored in a different buffer and a single bit to permit/deny checking beyond the apparent end of the buffer. The method of U.S. Pat. No. 7,165,150 does not handle unmatched call returns such as setjump/longjump when unwinding a shadow stack. U.S. Pat. No. 7,165,150 is hereby incorporated by reference into the specification of the present invention.

U.S. Pat. No. 7,178,010, entitled "METHOD AND APPARATUS FOR CORRECTING AN INTERNAL CALL/RETURN STACK IN A MICROPROCESSOR THAT DETECTS FROM MULTIPLE PIPELINE STAGES INCORRECT SPECULATIVE UPDATE OF THE CALL/RETURN STACK," discloses a method of saving return addresses in different segments of memory. Two stacks are used, the first stores data, and the second stack stores correction information related to call and return instructions. The method of U.S. Pat. No. 7,178,010 does not handle unmatched call returns such as setjump/longjump when unwinding a shadow stack. U.S. Pat. No. 7,178,010 is hereby incorporated by reference into the specification of the present invention.

Known U.S. patent applications include:

U.S. patent application Ser. No. 10/229,712, entitled "METHOD AND PROGRAM FOR INHIBITING ATTACK UPON A COMPUTER," discloses a method of encrypting the return address in computer memory to prevent a buffer overflow attack. The present invention is not directed toward encrypting the return address in memory. U.S. patent application Ser. No. 10/229,712 is hereby incorporated by reference into the specification of the present invention.

U.S. patent application Ser. No. 10/313,940, entitled "POINTGUARD: METHOD AND SYSTEM FOR PROTECTING PROGRAMS AGAINST POINTER CORRUPTION ATTACKS," discloses a method of protecting against pointer corruption by encrypting a pointer. The encrypted pointer is decrypted before the pointer is read. The present invention is not directed toward encrypting pointers. U.S. patent application Ser. No. 10/313,940 is hereby incorporated by reference into the specification of the present invention.

U.S. patent application Ser. No. 10/386,709, entitled "METHOD AND APPARATUS FOR CONTROLLING STACK AREA UN MEMORY SPACE," discloses a method of designating a temporal stack area in which to receive stack overwrites. The method of U.S. patent application Ser. No. 10/386,709 guards against stack overwrites, but does not guard against direct memory writes as does the present invention. U.S. patent application Ser. No. 10/386,709 is hereby incorporated by reference into the specification of the present invention.

U.S. patent application Ser. No. 10/726,229, entitled "APPARATUS, SYSTEM AND METHOD FOR PROTECTING FUNCTION RETURN ADDRESS," discloses a method of protecting against stack overflow by storing the return address and the stack pointer in a separate stack. The return address is evaluated before executing the return to see if it is a valid return address. No read or write function is permitted to the separate stack, thereby making this second stack secure. The method of U.S. patent application Ser. No. 10/726,229 guards against stack overwrite, but does not guard against set jump/long jump mismatch in the stack. U.S. patent application Ser. No. 10/726,229 is hereby incorporated by reference into the specification of the present invention.

U.S. patent application Ser. No. 10/835,496, entitled "PROGRAM SECURITY THROUGH STACK SEGREGATION," discloses a method of creating two stacks joined at the base, where protected data is placed in one of the stacks, and unprotected data is placed in the other stack. Protected data, generally frame pointers and return addresses, are placed in the stack that grows downward while unprotected data stack grows upward. While the method of U.S. patent application Ser. No. 10/835,496 guards against most types of stack overflows, the inventor acknowledges that in rare cases an attacker can find and exploit the method in U.S. patent application Ser. No. 10/835,496 by inputting enough data or doing a direct overwrite. Additionally, the method in U.S. patent application Ser. No. 10/835,496 will not work compatibly with asynchronous stack unwinding such as set jump/long jump or structured exception handling. The present invention is designed to detect and correct the situation when an attacker overwrites the return address on the stack correctly handle asynchronous stack unwinding. U.S. patent application Ser. No. 10/835,496 is hereby incorporated by reference into the specification of the present invention.

U.S. patent application Ser. Nos. 10/746,667 and 10/644,399, both entitled "METHOD AND APPARATUS TO RETAIN SYSTEM CONTROL WHEN A BUFFER OVERFLOW ATTACK OCCURS," discloses a method of creating two stacks, wherein the return address is stored on the first stack and the second stack. After a function executes, the method compares the return address on each stack, and if they are the same, returns to that location, otherwise issues a fault. The method described in U.S. patent application Ser. No. 10/644,399 is equivalent to the method described in U.S. Pat. No. 7,178,010 above. The method does not protect against set jump/ long jump where the unmatched call/return function may correctly have different return addresses. U.S. patent application Ser. Nos. 10/746,667 and 10/644,399 are hereby incorporated by reference into the specification of the present invention.

U.S. patent application Ser. No. 10/768,750, entitled "METHOD OF PROTECTING A COMPUTER STACK," discloses a creating two stacks, storing the return address on both stacks, and comparing the two return addresses before returning after completing execution of a subroutine. At least one of the return addresses may be encrypted on the stack. If the two return addresses are not the same, a fault occurs. Although U.S. patent application Ser. No. 10/768,750 protects against stack overflow, it does not address mismatched calls/returns such as set jump/long jump. U.S. patent application Ser. No. 10/768,750 is hereby incorporated by reference into the specification of the present invention.

U.S. patent application Ser. No. 10/813,599, entitled "STACK CACHING USING CODE SHARING," discloses a mixed stack comprising a register stack and a memory stack. Although directed toward virtual machine memory function, the method discloses shift operations at one of the stacks to properly maintain the top of the stack indication. The present method does not pertain to stack state aware translation. U.S. patent application Ser. No. 10/813,599 is hereby incorporated by reference into the specification of the present invention.

U.S. patent application Ser. No. 11/014,111, entitled "WRITE PROTECTION OF SUBROUTINE RETURN ADDRESSES," discloses a method of moving return addresses to the processor and providing a method of write protecting the return addresses to make them non-accessible. The method does not provide a mechanism to fix mismatches in return addresses. U.S. patent application Ser. No. 11/014,111 is hereby incorporated by reference into the specification of the present invention.

U.S. patent application Ser. No. 11/095,719, entitled "PROVIDING EXTENDED MEMORY PROTECTION," discloses a mechanism to make memory locations non-accessible, thereby providing a level of security. The present method does more than just make memory locations non-accessible. U.S. patent application Ser. No. 11/095,719 is hereby incorporated by reference into the specification of the present invention.

U.S. patent application Ser. No. 11/165,268, entitled "METHOD AND APPARATUS FOR MANAGING A LINK RETURN STACK," discloses a separate stack for return addresses, and a method of identifying misdirected return addresses. Although the method identifies misdirected return addresses, it does not attempt to correct the errant return location. U.S. patent application Ser. No. 11/165,268 is hereby incorporated by reference into the specification of the present invention.

There exists a need to protect information stored on a stack in an easily accessible but unmodifiable location, and to protect the unmatched calls/returns from being overwritten.

SUMMARY OF THE INVENTION

It is an object of the present invention to protect information stored on a stack in an easily accessible but un-modifiable location, and to protect the unmatched calls/returns from being overwritten.

It is a further object of the present invention to store the protected information in a non-spoofable, efficient way.

In the present invention, two computer stacks are created, a first computer stack operates as a traditional stack would, and a second computer stack, or shadow stack, stores the return address upon a call to a subroutine, the address of the return address on the first computer stack, and a user-definable state variable.

After jumping to, and executing a subroutine, the return address from both the first computer stack and the second computer stack are compared. If the return addresses match, the method jumps to the return address. If the return addresses do not match, a mismatch situation exists. When a mismatch occurs, the second stack is searched for a matching return address. First, below the stack top is searched, and then above the stack top is searched. If a matching return address is found, it is checked to make sure that the corresponding address of the stack pointer stored in the second stack matches the current location of the first stack's pointer, and that the user-definable variable indicates that the data was stored on the second stack as a return address datatype.

DETAILED DESCRIPTION OF THE INVENTION

Figure 1A:
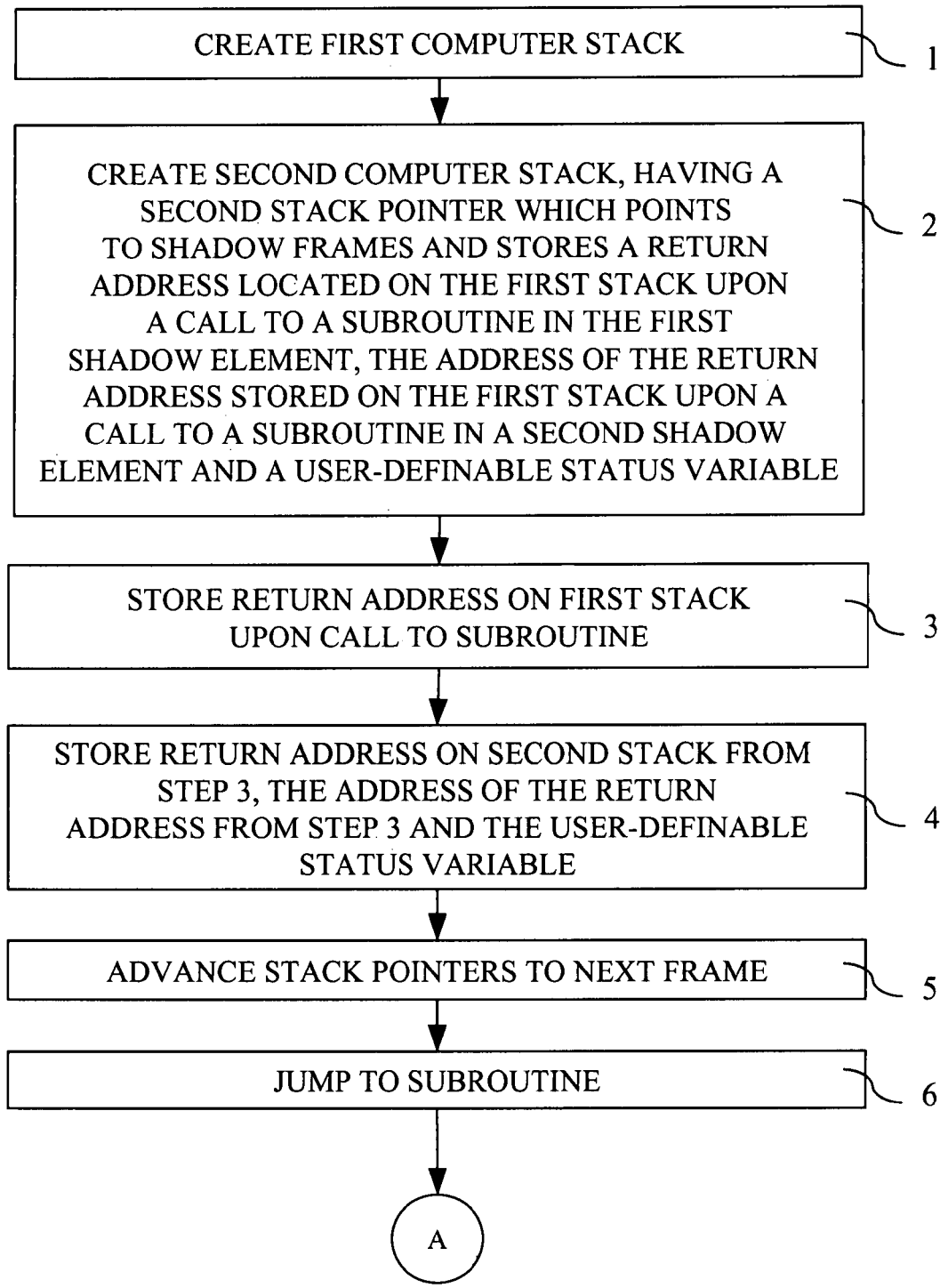
FIGS. 1a-1c are a flowchart of steps of the present invention.

The present invention is a method of protecting information stored on a stack in an easily accessible but un-modifiable location, and to protect the unmatched calls/returns from being overwritten.

The present invention prevents exploits of the return address stored on the stack.

There are three problems that are somewhat competing but each must be solved in order to have viable protection: 1) binary compatibility (i.e. no modifications are required of any binary that might run in a system), 2) strong authentication of the instruction pointer and 3) maintaining synchronization between the top shadow frame and the first stack pointer to enable the first 2 problems. The present invention addresses each of these problems.

Usually the control flow graph (CFG) of procedure-based applications is routine and interacts with the stack in a Last In First Out (LIFO) manner. For example CFG1: caller 0 calls sub-routine 1, sub-routine 1 calls 2, sub-routine 2 returns to 1, caller 1 calls sub-routine 3, sub-routine 3 returns to 1, sub-routine 1 returns to 0, and caller 0 exits. In this CFG the calls and returns are paired and matched.

However, there can be legal out of order unwinding of the call frames on the stack which un-match some of the calls and returns although a call is still paired with a return. For example, in the POSIX API there are two functions, setjump and longjump that are used to out-of-order unwind the control flow. In this example, it may be optimal to avoid the overhead of unwinding the stack and simply return to a function stored several frames before the current frame because the termination condition has been met in a deeply nested set of function calls. Using the previous CFG1: caller 0 calls setjump (establishing where control flow can return to) and then calls sub-routine 1, sub-routine 1 calls 2, sub-routine 2 returns to 1, caller 1 calls sub-routine 3, sub-routine 3 determines it is done and calls longjump (changing control back to caller 0), and caller 0 exits. Another situation occurs when a system call (i.e. the HW/SW interface between a user mode and supervisor mode) will return from supervisory mode and the application stack will be unwound by the OS to a frame before the frame used upon entering into supervisory mode.

There also can be dynamic redirection where the branching address is computed before entry into a sub-routine (e.g. dynamically loaded library entry points must be computed after load), which can un-match and un-pair calls and returns. For example, the computed address is pushed and a return instruction is issued (e.g. push ecx; ret). A return instruction is used to "call" a computed sub-routine entry point but there is no corresponding call instruction to the return. Doing it this way cleanly prunes the leaf off the call tree by not disturbing the stack frame layout. Another legal technique is structured event handling (SEH) which also introduces a new call tree into the pre-existing control flow with a similar push/ret calling mechanism in the software. SEH will sometimes also unwind the stack similar to a longjump in addition to redirecting flow with the push/ret mechanism—a double whammy to ordered stack behavior, so to speak.

Another problem of maintaining compatibility with call-return symmetry is when a function may be entered by a legal but non-standard way. For example, normally a function is entered by issuing a call instruction such as "call function; . . . ret;". However, the function entry could be emulated by the following not unusual code: "push eax; . . . jmp function; . . . ret;". In this case the ret is unpaired with any call.

Managing the instruction pointer also breaks the call-return symmetry. Some processors do not have access to the Instruction Pointer directly and must get the information indirectly. For example, x86 applications must issue a "call 0;pop ebx" to load the instruction pointer into register ebx. Other processors have this limitation as well.

Therefore, any solution that protects the return address stored on the stack by using the call and return state machine must be prepared to handle 1) matched call and returns, 2) unmatched but still paired call and returns, and 3) unmatched and unpaired calls and returns. All of the prior art handles condition one, some of the prior art will partially handle condition two, and none handle condition three. Almost every application today does computed branching or SEH in their run-time and thus they will falsely fault on condition three using the prior art. It is undecided how to verifiably resolve this particular fault (in a variable instruction length stream it is impossible to conclusively reverse flow the instruction stream from the point of fault if a push occurred, and in a fixed length instruction set, the first encountered branch in a backwards traversal of the instruction flow also invalidates the analysis). Thus, every application that falsely faults (almost all of them) will have to be terminated unless they are re-written to avoid conditions two and three. The IT industry has a huge sunk cost in existing software tools and techniques so it would not be economically viable to rewrite applications to be aware of a return address protection scheme in hardware.

It is an advantage of the present invention that method disclosed will work with unmodified binary applications transparently and not fault on legal code that manipulates control flow in any of the ways mentioned above.

Another problem that must be solved to make any return address protection scheme viable is protecting the protection mechanism itself. Some of the prior art copies a return address elsewhere in order to check it later. If the "elsewhere" is not a secure location (i.e. immune to any kind of overwrite, adjacent or direct), then the problem of stopping stack overflow exploits is just one step removed and not stopped—the attacker will attack the stored copy (or both) rather than the original. Some of the prior art mentions ways to protect the return address copy from being overwritten by adjacent overwrites but they do not protect against the less obvious direct overwrite. Others mention storing the data within the core of the CPU but that is not accessible to a user-threaded application. It is also not efficient from a context switch perspective since that information must always be saved for each process. It is also not power efficient because there will be additional power needed to the additional memory added to the core. Lowering power usage is a critical competitive direction for CPU manufacturers today.

It is assumed that the present method will be used in conjunction with no execute page protection capable processors, but it is not assumed that the protection is enabled for the application.

Figure 1B:
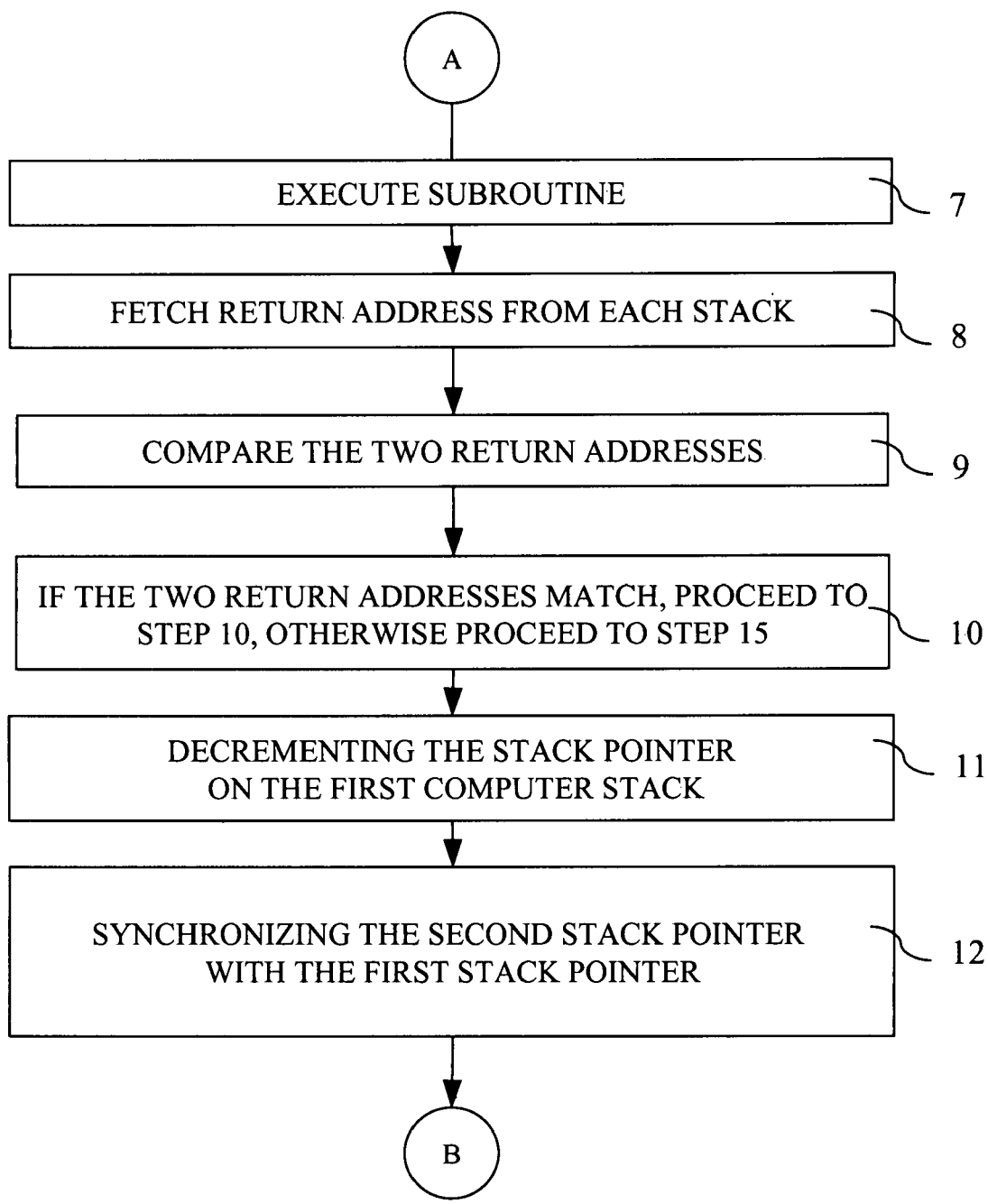
Figure 1C:
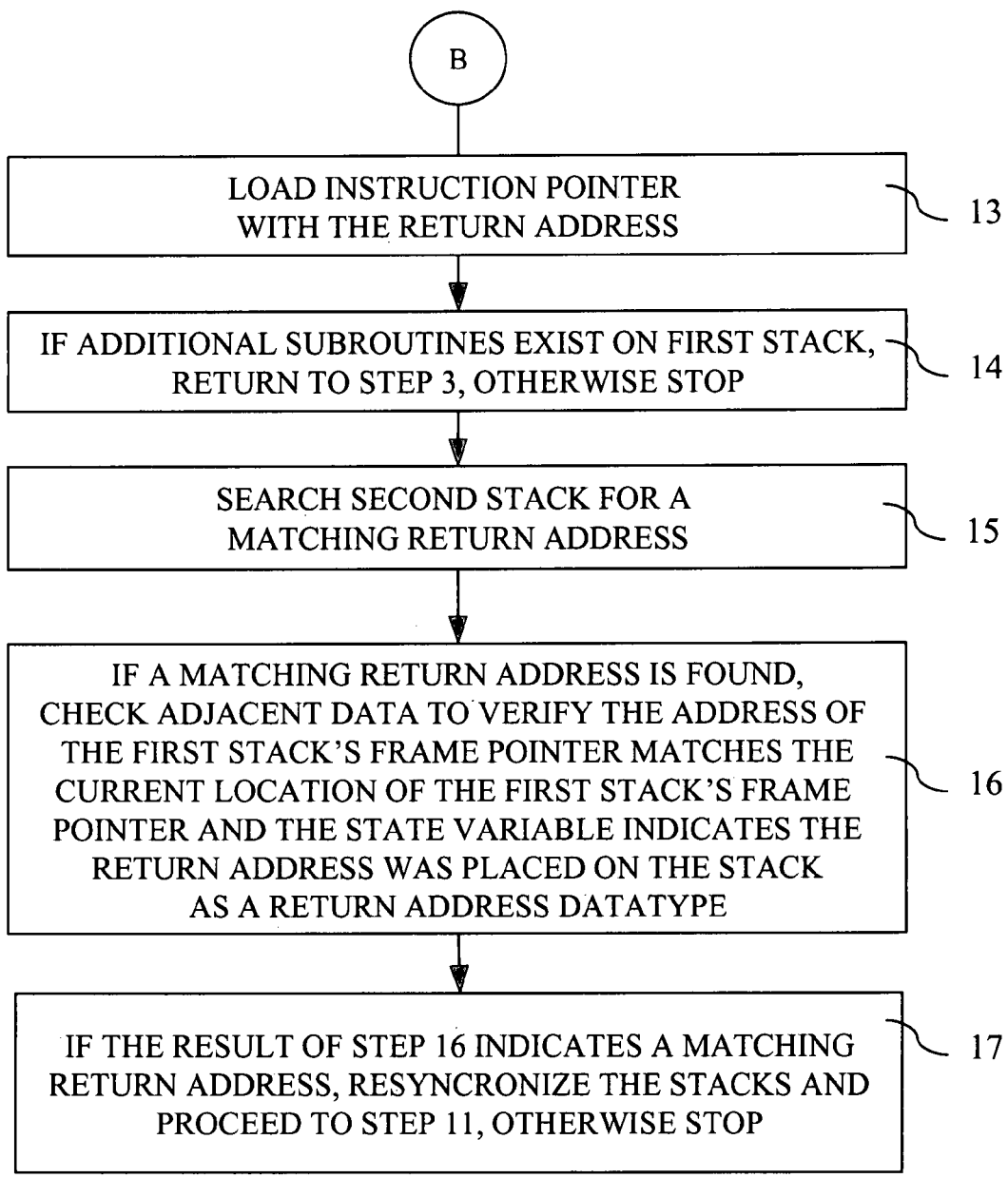

FIGS. 1a-1c are a flowchart of the steps of the present invention.

The first step 1 of the present method is creating a first computer stack on a computer. The first computer stack has a first stack pointer that references the data stored on the stack. The method of creating a computer stack is well known to persons skilled in the art and will not be further described herein.

The second step 2 of the present method is creating a second computer stack on a computer. The second computer stack has a second stack pointer that references the data stored on the second stack in a plurality of shadow frames. The second computer stack stores at least three pieces of data per shadow frame: the return address located on the first stack upon a call to a subroutine, the address of the return address stored on the first stack (i.e. the contents of first stack pointer at the time the return address was stored), and a user-definable variable defining the status of the frame on the second computer stack. The user-definable variable preferably indicates that the data was stored during the call from a subroutine and that the data was stored on the stack as a return address. Persons skilled in the art will recognize that other user-definable data may be stored on the stack without deviating from the inventive method presented (e.g. the frame is active/inactive, or the frame is the top or the bottom of the shadow, the frame is a frame pointer data type, etc).

The present method requires the call and return instructions be modified to reference the second, or shadow, stack. The OS/application creates the second stack initially or alternatively, the OS/application could create it when the hardware faults due to non-existence of the area.

An optional embodiment to protecting the shadow stack from overwrites would be for the OS (or the loader) to randomly locate the shadow when it is created.

Another optional embodiment to protecting the shadow stack from overwrites would be for the OS to create the memory used for the shadow area as read-only, either physically or logically. Then this area would only be writeable by the shadow aware portions of the modified instructions such as the call but not writeable by any other instructions including the non-shadow aware parts of the shadow aware instruction. For example, the memory could be owned by supervisor (vs. non-supervisor) and therefore not writeable by non-supervisory instructions (except the shadow aware portions). This is ill advised in the general case because allowing non-supervisory writes into supervisory memory violates the protection boundary and could seriously affect the stability of a device. However, in the present invention, the shadow stack pointer can be restricted to only allow supervisor update. Thus, the supervisor can safely contain what the shadow stack pointer points to. Another example of write able read only memory would be to either ignore the existing read protect bits for the shadow aware portion of an instruction or add a new attribute bit that indicates this memory is shadow memory.

The third step 3 of the present method is storing a return address upon a call to a subroutine on the first computer stack.

The fourth step 4 of the present method is storing on the second stack: the return address from the third step 3, the address of the return address from the third step 3 (e.g. the first stack pointer), and the user-definable status variable to indicate the current shadow frame contains a return address and it is active. Each of these data elements is stored in one shadow frame.

The fifth step 5 of the present method is advancing the first stack pointer to the next available frame on the first computer stack and advancing the second stack pointer to the next available shadow frame on the second computer stack.

The sixth step 6 of the present method is jumping to the subroutine. The seventh step 7 of the present method is executing the subroutine.

The eighth step 8 of the present method is fetching the return address from the next shadow frame on the second computer stack and the return address from the first computer stack. Persons skilled in the art will recognize that the frame below the current shadow stack pointer contains the expected return address.

The ninth step 9 of the present method is comparing the return address from the second computer stack to the return address from the first computer stack.

In the tenth step 10 of the present method, if the return address from the second computer stack is the same as the return address from the first computer stack, proceed to the eleventh step 11, otherwise proceeding to the fifteenth step 15.

The eleventh step 11 of the present method is decrementing (moving) the stack pointer of the first computer stack to the previous (older) frame. Step 11 starts the "synchronize stage" which is independent of the stack contents check.

The twelfth step 12 of the present method is synchronizing the shadow stack pointer with the first stack by decrementing (moving) the second stack pointer on the second computer stack to a previous (older) shadow frame. Typically, it is one frame but it's possible that more than one shadow frame will need to be "popped" (e.g. a longjump unwinding the first stack out order) before the first stack pointer is "matched" to the nearest shadow frame stored below the shadow frame pointer (i.e. stopping at the first match that is below or equal to the new first stack pointer). This will not delete the information stored in the shadow frames. The information once written in a shadow frame is only overwritten by another shadow aware instruction (e.g. call or push) into the shadow frame. Data must remain for search purposes later.

An optional independent step to avoid the infrequent inefficiency of an indeterminate number (i.e. more than 1) of shadow frame pops is to check for shadow synchronization on any pop-like operation of the first stack pointer, not just a return operation (e.g. "pop ebp" or anytime the first stack pointer is unwound "add esp, xxx"). For example, after the pop instruction has finished with the first stack pointer adjustment, compare with the stored stack pointer in the shadow frame and decrement the shadow pointer by one, and only one, frame if not synchronized. This will allow the twelfth step 12 to almost always default to the fast path of decrement by 1 frame, before taking a slower path of multiple decrements.

This is important for modern CPU architectures that execute large pipelines and execute instructions out of order. Unfortunately, stack decrement instructions occur frequently enough that imposing any overhead on one will affect the CPU performance in general so it must be very close to a no-op performance-wise. This is true in this case. Most of the time the pop instruction will not need to do anything except compare and return since the shadow is usually synchronized. Limiting the resynchronization shadow pop to just one frame also limits the performance impact since a fixed operation in core (i.e. 1 atomic operation) is always faster than an indeterminate number of operations. If more than one shadow frame resynchronization pop is needed, as is the case sometimes, multiple pops instructions often occur before another return instruction, usually more than enough to pop one at a time the shadow until it is synchronized. If more pops are needed, the return operation will fall into the slow path and finalize the synchronization. The current and previous shadow frame can easily be cached within the core (vs. slower L2 or L3 cache) to make the access to them quick and avoids a pipeline stall in all single shadow frame pop operations.

The thirteenth step 13 of the present method is loading the instruction pointer with the return address.

In the fourteenth step 14 of the present method, if additional subroutines exist on the first computer stack, returning to the third step 3, otherwise stopping.

If the user has arrived at the fifteenth step 15, it is a mismatch and/or desynchronized state. We need to try and recover as best possible before accepting failure.

The fifteenth step 15 of the present method is searching the second computer stack, below the position of the shadow stack pointer and above the position of the shadow stack pointer, for a return address that matches the return address fetched from the first computer stack. In practice if the stacks were desynchronized, a match is found within two or three shadow frames of the current shadow pointer.

In the sixteenth step 16 of the present method, if a matching return address is found in the fifteenth step 15, determine if user-definable status variable indicates the shadow frame containing the return address was stored as a return address.

In the seventeenth step 17 of the present method, if the result of the sixteenth step 16 indicates a matching return address proceed to eleventh step 11, otherwise stopping.

In an alternate embodiment, a user could elect not to perform steps fifteen 15, sixteen 16 and seventeen 17 above, and abandon strict content matching. This permits more liberal implementation (thereby enhancing binary compatibility in the case of unpaired call/ret) but offers slightly less protection.

A related side effect and advantage of this alternate embodiment is the case where multi-threaded code is shadow unaware. In this case, all threads will share one stack shadow. Typical multi-threaded code does a context switch to maintain a unique stack per fiber/thread. Without the context switch completing the shadow stack switch too, the application will quickly stop—threads will collide in the common shadow and overwrite other threads shadow frames. However removing the requirement for strict matching with de-synchronization, allows them to transparently continue when they collide. Protection is reduced around the frames that collide during the thread switch but is restored as the thread continues.

For this alternate embodiment, step one 1 through step fourteen 14, described above would occur, followed by the following steps described in greater detail below.

The fifteenth step 15 of alternate embodiment is re-synchronizing the second stack with the first stack by decrementing (moving) the second stack pointer on the second computer stack to a previous (older) shadow frame. It is possible that more than one shadow frame will need to be "popped" (e.g. a longjump unwinding the first stack out order) before the first stack pointer is "matched" to the nearest shadow frame stored below the shadow frame pointer (i.e. stopping at the first match that is below or equal to the new first stack pointer).

In the sixteenth step 16 of the alternate embodiment, if the first stack pointer matches the stack pointer in the shadow frame found in fifteenth step 15, (i.e. the stack is re-synchronized) then proceeding to step 17, otherwise proceeding to step 19.

The seventeenth step 17 of the alternate embodiment is searching the second computer stack, below the position of the shadow stack pointer and above the position of the shadow stack pointer, for a return address that matches the return address fetched from the first computer stack. In practice if the stacks were desynchronized, a match is found within two or three shadow frames of the current shadow pointer.

In the eighteenth step 18 of the alternate embodiment, if the result of seventeenth step 17 indicates a match, proceeding to nineteenth step 19, otherwise stopping.

The nineteenth, and final, step 19 of the alternate embodiment is decrementing (moving) the stack pointer of the first computer stack to the previous (older) frame, and proceed to step 13.

Unfortunately, this alternate embodiment also provides an opening for an attacker if he can perturb the first stack pointer enough to force a desynchronization that must be given a free pass. Fortunately, the places where any legal desynchronizations naturally occur are deep in the code and not easily accessible by user data. Unfortunately, they also occur consistently but very infrequently and must be respected. Therefore, any data that can directly or indirectly affect the first stack pointer must be protected somehow. Most of the time the first stack pointer is changed by data that is not controllable by an attacker (e.g. "sub esp, 0x14").

In some CPU architectures (e.g. x86) the frame pointer can affect the stack pointer. Like a return address, the frame pointer is stored on the first stack and is restored just before a return occurs and can be affected by an attacker. For example, the x86 instructions that occur in a function prologue to store the frame pointer ("push ebp") and in the function epilogue to restore the frame pointer ("pop ebp" or "leave"). The leave instruction will put the frame pointer into the stack pointer and load the stored frame pointer into the frame pointer. If this happens a second time, (e.g. on the return from the calling function) the stack pointer will be affected when the now tainted frame pointer is moved to the stack pointer. Thus, the stored frame pointer can influence the stack pointer. This is extending the known frame pointer attack. In architectures where the frame pointer and the stack pointer are independent, this is not a problem for the present method.

In this alternate embodiment, like the call and return instructions of the preferred embodiment, frame pointer instructions that work with the first stack need to be hooked to be shadow stack aware (e.g. for x86 "mov ebp,esp" or "push ebp" are the call, "pop ebp" and "leave" are the return equivalent). The type of shadow frame must be distinguished from the return address and only checked for frame pointer contents shadow match operations. The user-definable status variable permits the frame pointer datatype to be distinguishable over the return address datatype. This distinction is critical in not allowing a local stack address (i.e. the frame pointer) to be used for a return address integrity check. The same rules of synchronization for return address protection in the present method should be observed for frame pointer protection in this alternate embodiment. Namely, if the stacks remain synchronized, there must be a matching value but if the stacks cannot be exactly synchronized, the integrity check is ignored.

So to protect the frame pointer in architectures where it can affect the stack pointer, the steps one 1, through step nineteen 19 of the alternate embodiment are repeated as above. However, the frame pointer is substituted for the return address wherever the return address is stored or referenced. Additionally the seventeenth step 17 that searches for a matching return address (now a matching frame pointer) below and then above the shadow pointer will only search below. This is necessary because, unlike a call instruction, a frame pointer instruction saves data that could be tainted by an attacker and thus an attacker could plant a Trojan value on the shadow at a particularly deep call depth. Later this value could remain but above the shadow pointer at the point of a second attack and thus be used to spoof the check if we were to search above. This also will not falsely fault because frame pointers inherently follow the LIFO order of a stack, unlike return addresses.

Generally, when the frame pointer is overloaded as a general register, the alternate embodiment will not adversely react to this. Overloading can happen in optimized compiled code that needs an additional register beyond the usual set it references and a compiler is smart enough to safely use the frame pointer. It can happen in hand compiled code too. Usually what happens is the frame pointer is saved to the stack for the scope of the optimization and then restored. This is completely transparent to any checking mechanism such as the alternate embodiment.

One can combine either embodiment to protect the return address, the frame pointer, or both depending on the context of the architecture and the software running on it. Additionally one can easily protect any other piece of data on a stack using the embodiments shown with slight variations. For example, one could envision a new secure push/pop instruction pair (e.g. "pushs" and "pops") that would save data to the stack that must remain non-volatile.

The user-definable status variable also has importance when using paged memory as the storage area for the second computer stack as the hardware can use it to know when it is done searching (or traversing) in either direction before it faults, and the variable will prevent inadvertently searching through adjacent memory that was not part of the second computer stack and possibly falsely allowing a match.

Instead of using a user-definable status variable to indicate top and bottom of the shadow area, a person skilled in the art could surround the second computer stack with unmapped pages and if the search down (or up) the shadow stack does not match before it reaches the bottom (or top), terminate by a page fault. This would complicate things for the case where you had not yet searched UP the stack because the search was prematurely interrupted by the page fault. This state would need to be uniquely signaled somehow (a downward (or upward) shadow search mismatch (vs. synchronization) fault) so that when the instruction was restarted after the page fault, it wouldn't repeat the downward search again, which would fault at the undefined page again, repeat, etc. Alternatively, upon faulting on the downward search, the OS fault handler (vs. the HW) continues the upward search before either restarting the next instruction (upon a successful match and resynchronization of the shadow pointer) or terminating the process.

Unfortunately, remnant data in the page (i.e. memory above the high water mark of the shadow stack but below the upper guard page) would also be searched. This could fool the check if an attacker could populate the remnant memory with correctly formed shadow frames. Thus the status of a shadow frame (active vs. inactive) is an important distinction and forms a "lite" integrity check as well as an efficiency improvement.

The lower and upper bounds limiting requirements of desynchronization or mismatch searching could also be done using segments for the second computer stack instead of virtual memory, but segments are being phased out in favor of paged architectures.

The present method will run any code that only uses return sites generated by the call instruction even if the stack gets readjusted in between a call and return or there is an unpaired call/return. However, when there is a mismatch, searching above the second or shadow stack pointer is critical for safety. For example, some Windows code will copy the call frame to memory, unwind the stack to do some computation, and then copy the call frame from memory onto the stack again in a new place and return. The activity on the primary stack is not accurately recorded as LIFO in the shadow stack through call/ret instructions so the two stacks are now desynchronized. If one only checked below the second stack pointer, a fault would occur. However, since the present method also searches above the second stack pointer, it does not suffer from this limitation. In practice, the matching return address is normally found below the current location of the second stack pointer, but searching above provides greater chance of correcting a desynchronized state better than any prior art technique.

In an alternate embodiment, the return address on the second computer stack is encrypted upon a call to a subroutine with an encryption key and decrypting the return address after fetching the return address. The encryption key selected from the group of encryption keys consisting of the address on the computer stack at which the return address is to be stored, a fixed encryption key, a fixed encryption key in a central processing unit, a changeable encryption key, a changeable encryption key in the central processing unit, an address of the subroutine, an encryption key stored at a fixed delta from the address at which the return address is to be stored, and the stack pointer of the computer stack.

Having the second computer stack in the process memory space but with limited access has several advantages. These include:

Debugging. If the second computer stack were inaccessible or irreproducible after a fault, it would be difficult to know why it happened. This type of manipulation of the underlying established rules of instructions will likely break some applications in unexpected ways and it will be important to be able to rectify the code so it is compatible with the new restrictions described in the present invention.

Another advantage is that safely handling user-level multi-threaded applications is problematic with a second computer stack, but is made possible by having a user accessible second computer stack. If it is not accessible from the users space, a call to something external to the user space is required and thus defeats the purpose of a multi-fiber application.

A final advantage is the context switch is not additionally burdened since it does not need to save and restore the contents of the shadow; it will remain in the process memory.

While the preferred embodiments of the invention have been illustrated and described, it will be apparent to those of ordinary skill in the art that various changes and modifications may be made without deviating from the inventive concepts set forth above.

What is claimed is:

1. A method of protecting a value on a computer stack, comprising the steps of:
    a) creating a first computer stack on a computer, the first computer stack having a first stack pointer;
    b) creating a second computer stack on a computer, the second computer stack having a second stack pointer which points to shadow frames, wherein the second stack stores a return address located on the first stack upon a call to a subroutine in a first shadow element, the address of the return address stored on the first stack upon a call to a subroutine in a second shadow element, and a user-definable variable defining the status of the return address stored on the second computer stack in a third shadow element;
    c) storing a return address upon a call to a subroutine on the first computer stack;
    d) storing on the second stack the return address from step (c), the address of the return address stored in step (c), and the user-definable status variable to indicate the current shadow frame contains a return address;
    e) advancing the first stack pointer to the next available frame on the first computer stack and advancing the second stack pointer to the next available shadow frame on the second computer stack;
    f) jumping to the subroutine;
    g) executing the subroutine;
    h) fetching the return address from the second computer stack and the return address from the first computer stack, wherein the return address from the second computer stack is the first return address stored on the second computer stack below the current position of the second stack pointer;
    i) comparing the return address from the second computer stack to the return address from the first computer stack;
    j) if the return address from the second computer stack is the same as the return address from the first computer stack, proceed to step (c), otherwise proceeding to step (o);
    k) decrementing the stack pointer on the first computer stack;
    l) synchronizing the second computer stack's stack pointer with the first computer stack's stack pointer by decrementing the second stack pointer on the second computer stack to at least one previous shadow frame;
    m) loading the instruction pointer with the return address;
    n) if additional subroutines exist on the first computer stack, returning to step (c), otherwise stopping;
    o) searching the second computer stack, below the position of the current second stack pointer and above the position of the current stack pointer, for a return address that matches the return address fetched from the first computer stack;
    p) if a matching return address is found in step (o), and if user-definable status variable indicates the shadow frame containing the return address was stored on the second computer stack as a return address;
    q) if the result of step (p) indicates a matching return address, proceeding to step (k), otherwise stopping; and
    r) write-disabling the second computer stack by application software, the second computer stack write-enabled by hardware code when storing on the second stack the return address from step (c).

2. The method of claim 1, wherein the step of searching the second computer stack, above the current stack pointer and below the current stack pointer, for a value that matches the value fetched from the first computer stack further comprises searching below the current stack pointer before searching above the current stack pointer.

3. The method of claim 1, further comprising encrypting the return address of a next instruction upon a call to a subroutine with an encryption key and decrypting the return address after fetching the return address, the encryption key selected from the group of encryption keys consisting of the address on the computer stack at which the return address is to be stored, a fixed encryption key, a fixed encryption key in a central processing unit, a changeable encryption key, a changeable encryption key in the central processing unit, an address of the subroutine, an encryption key stored at a fixed delta from the address at which the return address is to be stored, and the stack pointer of the computer stack.

4. The method of claim 1, wherein the second computer stack is randomly located in memory when created.

5. A method of protecting a value on a computer stack, comprising the steps of:
    a) creating a first computer stack on a computer, the first computer stack having a first stack pointer;
    b) creating a second computer stack on a computer, the second computer stack having a second stack pointer which points to shadow frames, where the second stack stores a return address located on the first stack upon a call to a subroutine in a first shadow element, the address of the return address stored on the first stack upon a call to a subroutine in a second Shadow element, and a user-definable variable defining the status of the return address stored on the second computer stack in a third shadow element;
    c) storing a return address upon a call to a subroutine on the first computer stack;
    d) storing on the second stack the ret address from step (c), the address of the return address stored in step (a), and the user-definable status variable to indicate the current shadow frame contains a return address;
    e) advancing the first stack pointer to the next available frame on the first computer stack and advancing the second stack pointer to the next available shadow frame on the second computer stack;
    f) jumping to the subroutine;

g) executing the subroutine;

h) fetching the return address from the second computer stack and the return address from the first computer stack, wherein the return address from the second computer stack is the first return address stored on the second computer stack below the current position of the second stack pointer;

i) comparing the return address from the second computer stack to the return address from the first computer stack;

j) if the return address from the second computer stack is the same as the return address from the first computer stack, proceed to step k), otherwise proceeding to step (o);

k) decrementing the stack pointer on the first computer stack;

l) synchronizing the second computer stack's stack pointer with the first computer stack's stack pointer by decrementing the second stack pointer on the second computer stack to at least one previous shadow frame;

m) loading the instruction pointer with the return address;

n) if additional subroutines exist on the first computer stack, returning to step (c), other stopping;

o) re-synchronizing the second computer stack's stack pointer with the first computer stack's stack pointer by decrementing the second stack pointer on the second computer stack to at least one pious shadow frame;

p) if the first computer stack pointer matches the stack pointer in the shadow frame found in step (o) proceed to step (q), otherwise proceed to step (s);

q) searching the second computer stack, below the position of the shadow stack pointer and above the position of the shadow stack pointer, for a return address that matches the return address fetched from the first computer stack;

r) if the result of step (q) indicate a match, proceed to step (s), otherwise stopping;

s) decrementing the stack pointer of the first computer stack to the previous frame, and proceed to step (m); and t) write-disabling the second computer stack by application software, the second computer stack write-enabled hardware code when storing on the second stack the ret address from step (c).

6. The method of claim 5, wherein the step of searching the second computer stack, above the current stack pointer and below the current stack pointer, for a value that matches the value fetched from the first computer stack further comprises searching below the current stack pointer before searching above the current stack pointer.

7. The method of claim 5, further comprising encrypting the return address of a next instruction upon a call to a subroutine with an encryption key and decrypting the return address after fetching the return address, the encryption key selected from the group of encryption keys consisting of the address on the computer stack at which the return address is to be stored, a fixed encryption key, a fixed encryption key in a central processing unit, a changeable encryption key, a changeable encryption key in the central processing unit, an address of the subroutine, an encryption key stored at a fixed delta from the address at which the return address is to be stored, and the stack pointer of the computer stack.

8. The method of claim 5, wherein the second computer stack is randomly located in memory when created.

* * * * *